United States Patent [19]

Hawkes

[11] 3,937,881
[45] Feb. 10, 1976

[54] METHOD OF AND SYSTEM FOR TRANSCODING BINARY SIGNALS WITH REDUCED CHANGEOVER RATE

[75] Inventor: Thaddeus Hawkes, Paris, France

[73] Assignee: Thomson-CSF, Paris, France

[22] Filed: June 18, 1974

[21] Appl. No.: 480,398

[30] Foreign Application Priority Data
June 22, 1973  France .............................. 73.22878

[52] U.S. Cl. ............................ 178/68; 340/347 DD
[51] Int. Cl.$^2$ ......................................... H04L 15/00
[58] Field of Search ............................... 178/66–68;
340/347 DD; 360/40, 41, 43, 39

[56] References Cited
UNITED STATES PATENTS

| | | | |
|---|---|---|---|
| 3,488,662 | 1/1970 | Vallee ................................... | 360/40 |
| 3,500,385 | 3/1970 | Padalino et al. ............ | 340/347 DD |
| 3,623,041 | 11/1971 | MacDougall ................. | 340/347 DD |
| 3,697,977 | 10/1972 | Sollman et al. .............. | 340/347 DD |
| 3,705,398 | 12/1972 | Kostenbauer et al. ................. | 178/68 |

*Primary Examiner*—Howard W. Britton
*Assistant Examiner*—Robert Hearn
*Attorney, Agent, or Firm*—Karl F. Ross; Herbert Dubno

[57] ABSTRACT

A bit stream with a bit rate equaling the frequency of a train of accompanying clock pulses is transcoded into a two-level signal voltage having a reduced rate of changeover compared with the rate of alternation between 0 and 1 bits. Upon any shift from one kind of bit (e.g., 0) to the other kind of bit (e.g., 1), a transition between signal-voltage levels occurs in the middle of a clock-pulse cycle; the first bit of the first-mentioned kind (0) in a succession of a plurality of such bits, after a shift from the other kind of bit (1), is translated into a transition between signal-voltage levels occurring at the end of the corresponding clock-pulse cycle. Transcoding is accomplished with the aid of a three-stage shift register whose stage outputs are logically combined. Upon transmission of the signal voltage via a data channel to a remote receiver, the original bit stream is reconstituted by a decoder comprising a four-stage shift register stepped at twice the clock-pulse frequency, again with logical combination of the stage outputs. A timing-signal extractor at the receiver is locked in step with the transmitter, prior to data transmission, under the control of a synchronizing sequence of alternating 0 and 1 bits transcoded into a square wave of half the clock-pulse frequency.

10 Claims, 8 Drawing Figures

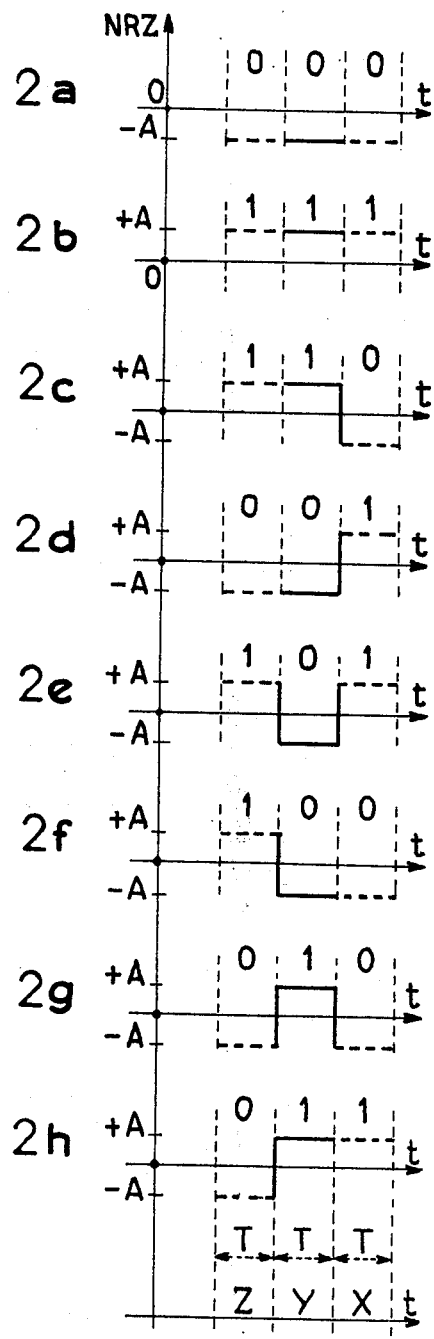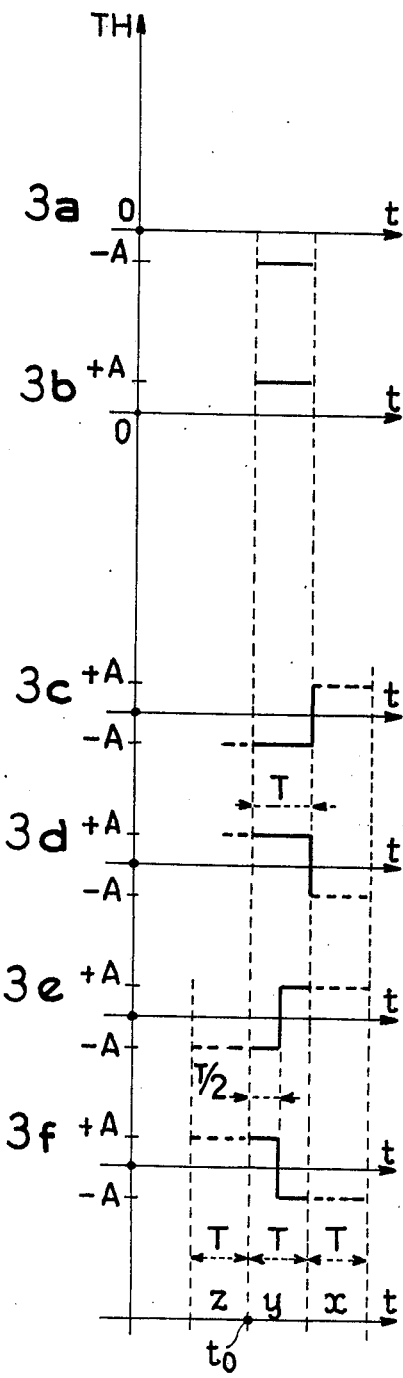

METHOD OF AND SYSTEM FOR TRANSCODING BINARY SIGNALS WITH REDUCED CHANGEOVER RATE

The present invention relates to a system for coding binary information by means of transitions.

Techniques for coding binary information using either direct coding or transitions are chiefly used in fields where data are transmitted in digital form.

The binary coding of digital information enables the symbols "zero" and "one" to be represented by predetermined electrical signals.

In direct coding, where respective electrical signals are assigned to the symbols 0 and 1, it is the state of the signal which is significant.

Conversely, in transition coding it is the transition between two consecutive signal states which is significant, the states of the signal being those used for direct coding.

In so-called NRZ (non-return-to-zero) or full-baud direct coding, each symbol has a level corresponding to it which is held constant during the whole of an elementary interval. An NRZ-coded signal can thus have two levels, −A for a "zero" symbol and +A for a "one" symbol; the duration of the elementary interval is equal to the clock period T of the digital time base, that is to say the duration of one "digit" of the signal, i.e., of one "bit cell" for a binary digit signal.

Transition coding of an NRZ signal produces a signal which is also binary and which has the two states −A and +A and the same digital time base T.

In a known method of coding an NRZ signal by means of transitions, a transition is brought about at the beginning of a bit cell when the bit is equivalent to 1 information. Another known method employs a transition at the center of the bit cell when the bit represents a 1, and a transition at the end of the bit when the bit represents a 0 followed by a 0.

In these methods of coding the resultant signal has a minimum length between two successive transitions which does not alter and which is equal to the clock period T of the digital time base.

The object of my invention is to provide a method of and means for transcoding a bit stream to produce a resultant two-level signal voltage wherein the minimum length between two successive transitions is greater than the clock period T of the digital time base; as a consequence the bandwith required to transmit the binary information is reduced.

I realize this object, in accordance with my present invention, by temporarily storing successive bits of a bit stream to be transcoded, each bit coinciding with a respective clock cycle, and generating a two-level signal voltage whose level changes in the middle of a clock cycle upon a shift from a first kind of bit, e.g., one representing a binary 0, to a second kind of bit, representing in that case a binary 1. Upon the occurrence of the first kind of bit (0) in a succession of a plurality of such bits, following a shift from a bit of the second kind (1), there occurs a level change at the end of the clock cycle. In all other instances, the level of the signal voltage is kept constant.

To carry out this method, e.g., in a data transmitter at an end of a communication channel, I provide storage means controlled by the clock pulses for temporarily preserving a plurality of successive bits of that bit stream, specifically a three-stage shift register with logical circuitry connected to its stage outputs. A complementary decoder in a data receiver at the other channel end may include a four-stage shift register with logical gating means connected to the stage outputs thereof. A timing circuit in the data receiver may comprise a local oscillator with an operating frequency harmonically related to the clock frequency and provided with a phase-locking loop enabling it to be locked in with the time base at the transmitting end in response to a synchronizing sequence of alternating bits of binary values 0 and 1 generated at the beginning of any data transmission.

The invention will now be further described with reference to the accompanying drawing in which:

FIGS. 2 and 3 are graphs showing the transition coding using an NRZ-coded signal as a basis;

Figure 1:
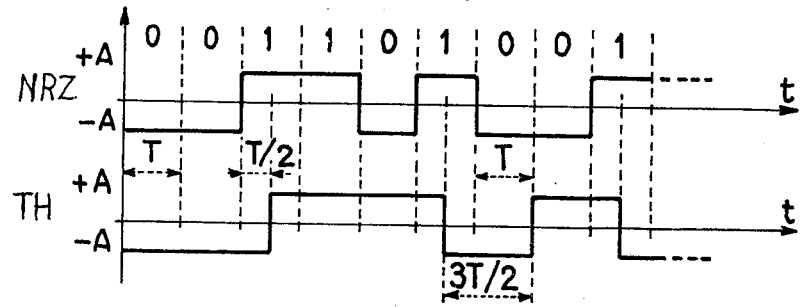
FIG. 1 is a set of graphs showing the conventional NRZ coding of a binary information, and the transition coding of that binary information in accordance with the invention.

In FIG. 1 I have shown an NRZ signal resulting from the direct NRZ coding of binary numerical information which in this example is formed by the successive symbols 001101001, and the resulting signal when this information is transition coded in accordance with the invention. To make the specification easier to read and understand, this second signal is called TH though it should be understood that this appellation is chosen at random.

The coding shown in graph TH results from the following mode of transformation: a transition in the middle of the binary digit if the digit is equivalent to a 1 symbol which comes after a 0 symbol in the binary message; a transition at the end of the binary digit if the digit is equivalent to a 0 symbol which follows a 1 symbol in the message with the proviso that the next symbol also is a 0; an absence of transitions when the symbols in the message are distributed in any other possible way.

The method of TH coding is shown in greater detail in FIGS. 2 and 3 which relate to the NRZ signal and to signal TH respectively. FIG. 2 shows, as waveforms $2a$ to $2h$, the eight different possible combinations of a succession of only three bit cells Z, Y and X from an NRZ signal. The bit cell concerned in the TH transition coding is the middle cell Y which is shown in solid lines, the adjacent bit cells Z and X being shown in broken lines. In FIG. 3 the different forms of the TH-transition-coded signal are shown by waveforms $3a$ to $3f$, the bit cell $y$ shown in solid lines being equivalent to cell Y in the NRZ signal. The levels of the adjacent bit cells $z$ and $x$ are not shown in their entirety since it is possible that there may be transitions once the corresponding bit cells Z and X have been coded to yield the signal TH. For this reason it will be assumed in what follows that where a level is mentioned for the $z$ bit cell preceding the $y$ bit cell, this will be the terminal level at the time $t_o$ shown, so as to make allowance for any possible transition at the end of the $z$ bit cell.

For the combination shown in graphs 2a to 2e, the corresponding $y$ signal is that shown at 3a when the preceding bit cell $z$ is at the −A level and that shown at 3b when the preceding level is +A. Similarly, the NRZ combination 2f is converted to waveform 3c or 3d depending on whether the prior state is −A or +A and the signals corresponding to NRZ combinations 2g and 2h are waveform 3e or 3f depending on whether the prior level is −A or +A.

The table below summarizes the various possibilities described:

| Z | 0 | 1 | 1 | 0 | 1 | 1 | 0 | 0 |
|---|---|---|---|---|---|---|---|---|
| Y | 0 | 1 | 1 | 0 | 0 | 0 | 1 | 1 |
| X | 0 | 1 | 0 | 1 | 1 | 0 | 0 | 1 |
| y | No transition | | transition at end of bit cell | | transition at center of bit cell | | | |

Figure 4:
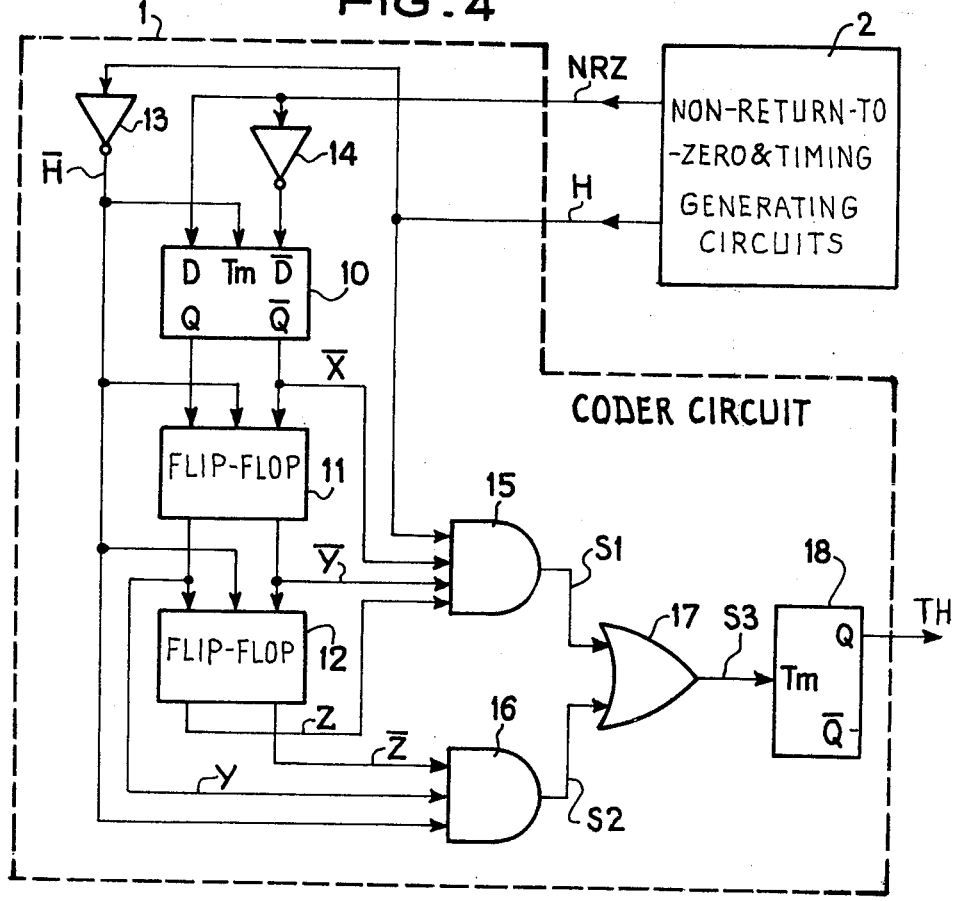
FIGS. 4 and 5 are a circuit diagram of a transition-coding system according to my invention and a set of graphs representing related waveforms.

FIG. 4 shows an embodiment of a TH-coding system according to my invention. It is made up of logic circuits forming an assembly 1. This assembly receives binary information from external circuits 2 in the form of an NRZ digital signal accompanied by synchronizing signals formed by a clock train or timing pulse signal H made up of pulses of duration T/2 which recur at a repetition period T. The logic assembly 1 contains three bistable circuits or flip-flops 10, 11, 12 designed to act as a three-stage shift register, these circuits being synchronized at their switching inputs Tm by a signal $\overline{H}$ which is equivalent to clock signal H delayed by T/2. This signal $\overline{H}$ is obtained simply by inverting signal H in an inverter circuit 13. Flip-flop 10 receives the NRZ signal at a data input D and at its other data input $\overline{D}$ it receives the same signal after it has been inverted in an inverter circuit 14. Outputs Q and $\overline{Q}$ of flip-flop 10 are connected respectively to the corresponding data inputs of flip-flop 11, and the same applies to flip-flops 11 and 12, the three flip-flops being connected in cascade. The logic function of these flip-flops is summarized below.

| $Q_n$ | D | $Q_{n+1}$ |
|---|---|---|
| 0 | 1 | 1 |
| 1 | 1 | 1 |
| 1 | 0 | 0 |
| 0 | 0 | 0 |

Thus, assuming a triggering on the leading edges of the positive-going pulses in signal $\overline{H}$ (FIG. 5), after three clock periods, signals Z Y X and their inversions will have been stored in flip-flops 12, 11 and 10, respectively.

A first AND circuit 15 receives outputs $\overline{X}$, $\overline{Y}$, Z and signal H respectively at its four inputs. Output S1 of the circuit in question is at 1 when the ZYX combination is 100. A second, three-input, AND circuit 16 receives outputs $\overline{Z}$, Y and signal $\overline{H}$ and forms a signal S2 which is equal to 1 if ZY is 01 (i.e., if ZYX is 010 or 011). Circuits 15 and 16, receiving the relatively phase-inverted clock pulses H and $\overline{H}$ from source 2, constitute a pair of coincidence gates. Signals S1 and S2 are combined in an OR gate or logical summing circuit 17 to form a signal S3 the value of which is 0 when the combinations are not those mentioned. Signal S3 is applied to input Tm of a binary-divider type of flip-flop circuit 18 the logic function of which is given below:

| $Q_n$ | Tm | $Q_{n+1}$ |
|---|---|---|
| 1 | 0 | 1 |
| 0 | 0 | 0 |
| 1 | 1 | 0 |
| 0 | 1 | 1 |

Figure 5:
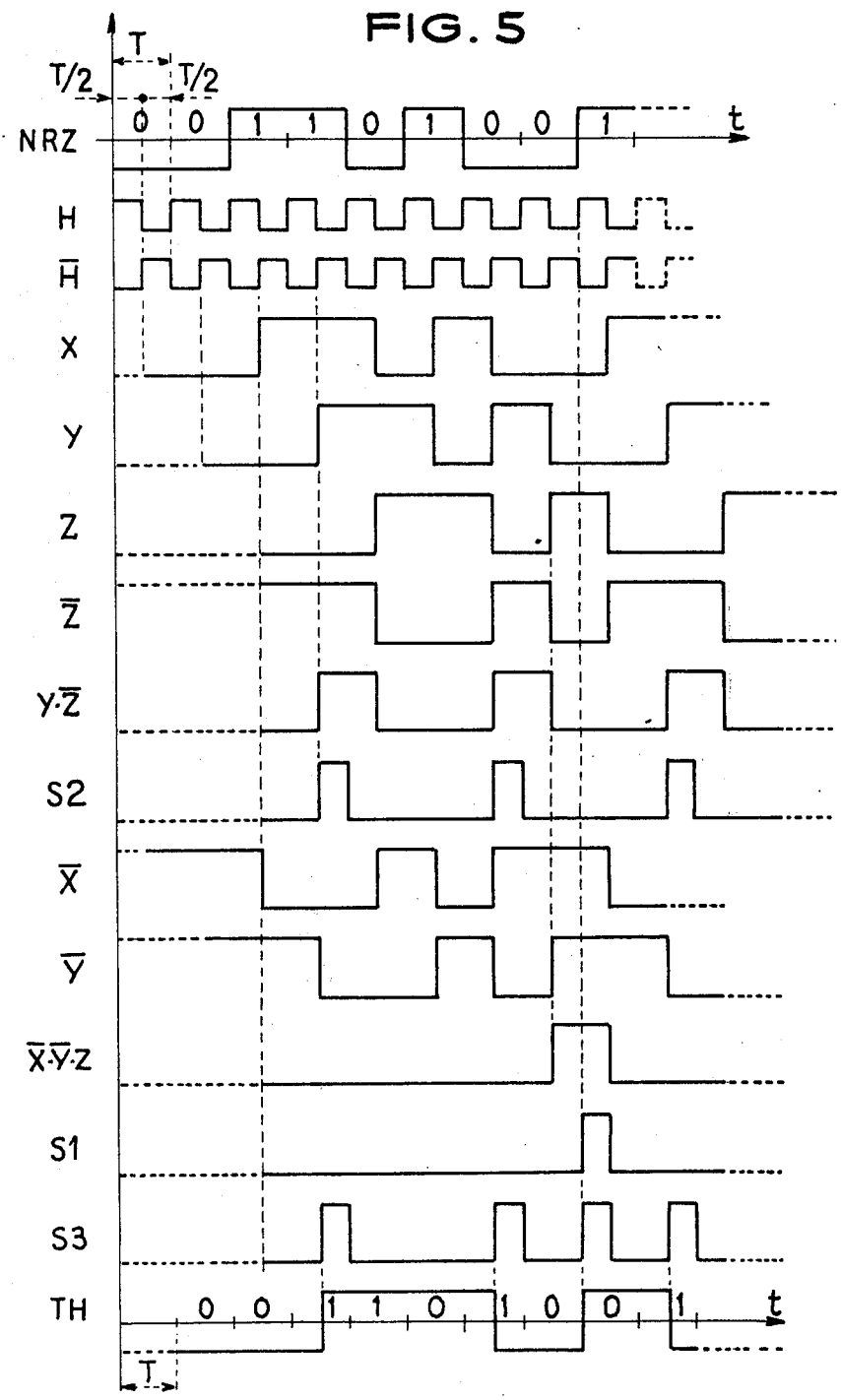

Circuit 18 supplies the coded signal TH; FIG. 5 shows the various signals formed in assembly 1 in the case of the NRZ signal shown. The time shift introduced by storing for coding purposes is not a hindrance in practice when it is remembered that a known preliminary sequence may be provided before the message, this sequence being advantageously formed by a series 101010 . . . to form a synchronizing clock sequence.

The coding system described is applicable in particular to a system for transmitting numerical data. In the case of radio transmission the coding system is placed before a modulating circuit at the end of the transmission chain, the TH signal forming the modulating signal of a high-frequency carrier. Conversely, after transmission, the received signal is processed at the input to the reception chain in a demodulator circuit which allows the low-frequency TH signal to be reconstituted. The latter then needs to be decoded to reproduce the original binary information; the NRZ signal must therefore be re-formed.

Figure 6:
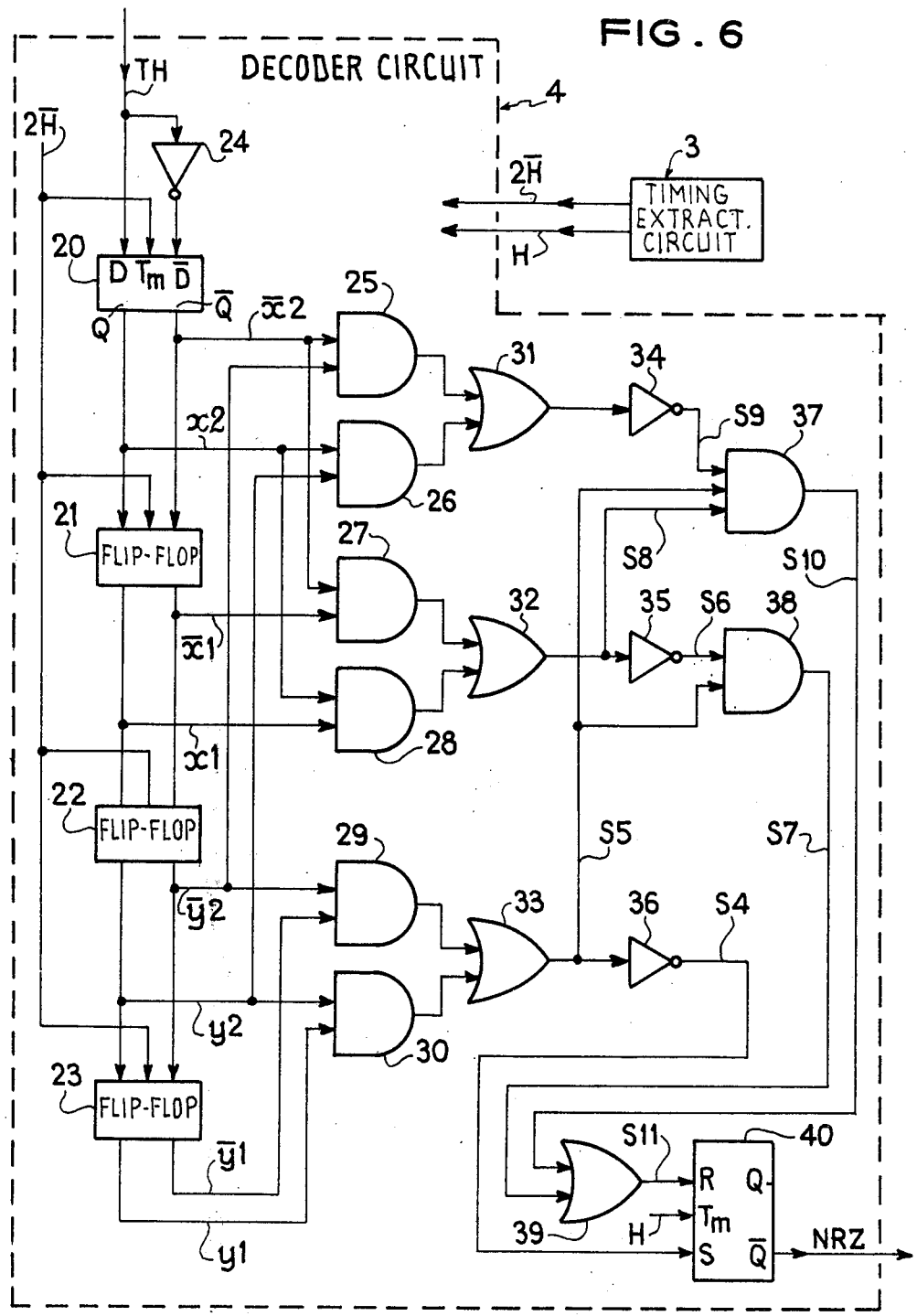
FIGS. 6 and 7 are a diagram of a circuit arrangement for decoding a transition-coded signal produced by the system of FIG. 4, so as to reconstitute the original NRZ-coded signal, and a set of graphs representing related waveforms.

FIG. 6 is an embodiment of a decoding circuit according to my invention which enables a TH signal to be converted back into an NRZ signal. The circuits which allow the clock signal H to be extracted are assumed to be produced by conventional techniques. These circuits are symbolized by a block 3 which, besides the extracted H signal, also supplies a signal $2\overline{H}$ which in the case envisaged results from doubling the frequency of the first signal and delaying it by a quarter cycle. The decoding process takes into account the values of two successive bit cells $y$ and $x$ where $y$ is the bit cell being decoded. Since a transition may take place in the middle of a bit cell, it is necessary to know for both of these bits their level during the first half of the bit cell, from 0 to T/2, and that during the second half of the bit cell, from T/2 to T, four values which are referred to as $y1$ and $y2$ respectively for the bit cell $y$ and $x1$ and $x2$ respectively for the bit cell $x$. The clock signal $2\overline{H}$, whose frequency is twice that of the digital time base, is used to carry out this sampling. The logic comparisons made for decoding purposes are summarized in the table below:

| y | x | y2,x2 | Y |
|---|---|---|---|
| $y1 \neq y2$ | | | 1 |
| | $x1 \neq x2$ | | 0 |
| $y1 = y2$ | | $y2 \neq x2$ | 0 |
| | $x1 = x2$ | | |
| | | $y2 = x2$ | Z |

Figure 7:
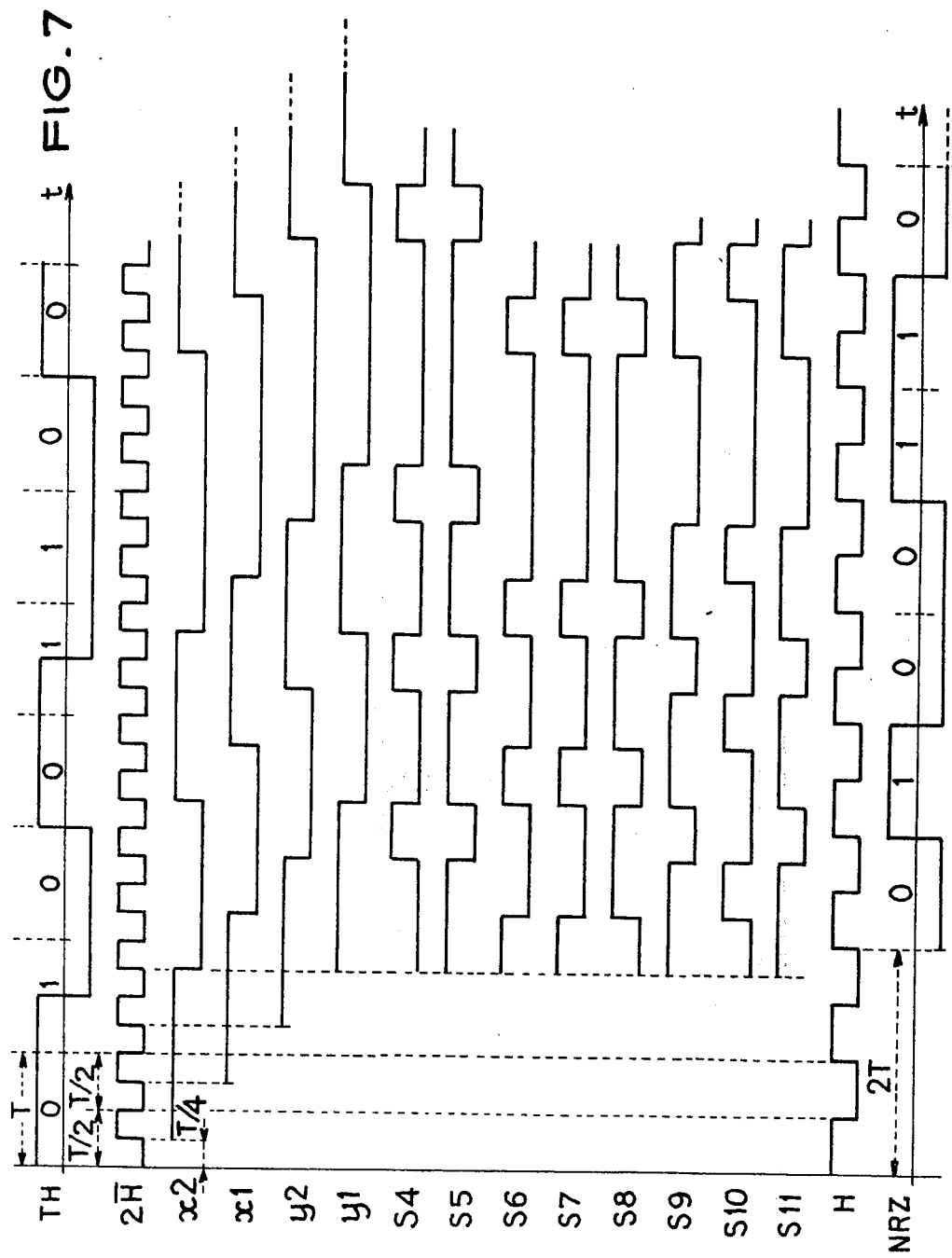

Four bistable circuits or flip-flops 20, 21, 22 and 23 designed to act as a four-stage shift register are connected in cascade and are synchronized by the signal $2\overline{H}$ and produce the various signals $x2$, $x1$, $y2$, $y1$ and their inversions, the first flip-flop receiving signal TH directly on its data input D and in negated form on its data input $\overline{D}$ after it has passed through an inverter circuit 24. The comparisons mentioned above are carried out by means of two-input AND circuits 25 to 30 and 38, two-input OR circuits 31 to 33 and 39, a three-input AND circuit 37 and inverter circuits 34, 35 and 36, the combination of circuits 31 and 34 constituting a NAND gate. The way in which they operate is apparent from the waveforms shown in FIG. 7 for one example of an incident signal TH. The combination of gates 29, 30, 33 and inverters 36, constituting an anticoincidence circuit or Exclusive-OR gate, supplies a signal S4 which is equal to 1 when $y1 \neq y2$ and this signal is applied to a setting input S of a flip-flop 40 which is controlled by its switching pulses H at clock input $Tm$, this type of bistable circuit also being known as an RST or set/reset flip-flop. Signal S5 at the output of circuit 33 is equal to 1 when $y1 = y2$ and is applied separately to AND circuits 37 and 38. The combination of gates 27, 28, 32 and inverter 35 also constituting an Ex-OR gate, produces a signal S6 when $x1 \neq x2$ and this signal is applied to the AND circuit 38 together with the aforementioned signal S5. Thus, output S7 of AND circuit 38 satisfies the double condition that $y1 = y2$ and $x1 \neq x2$. In the same way the combination of gates 25, 26, 31 and inverter 34 produces a signal S9 equal to 1 when $y2 \neq x2$ and this signal is applied to AND circuit 37 together with signal S5 and a signal S8 which is equivalent to signal S6 before it is inverted at 35. Output signal S10 from circuit 37 indicates that the conditions $y1 = y2$, $x1 = x2$ and $y2 \neq x2$ are satisfied. Signals S7 and S10 are combined in OR circuit 39 whose output S11 supplies resetting input R of flip-flop 40. The logic function of flip-flop 40 is summarized below:

| R | S | $Q_{n+1}$ |
|---|---|---|
| 0 | 0 | $Q_n$ |
| 0 | 1 | 1 |
| 1 | 0 | 0 |
| 1 | 1 | 0 |

The reconstructed NRZ signal is extracted from an output of flip-flop 40.

The embodiments to which FIGS. 4 to 7 relate are described by way of examples. The logic circuits used are based on the one hand on the triggering method which uses the rising edge of the pulses and on the other hand on the form of clock pulse selected. It is understood that modifications which use the described mode of transformation could be produced by making allowance for other methods of triggering and/or other forms of clock signal, but that these modifications still fall within the scope of my invention.

Figure 8:
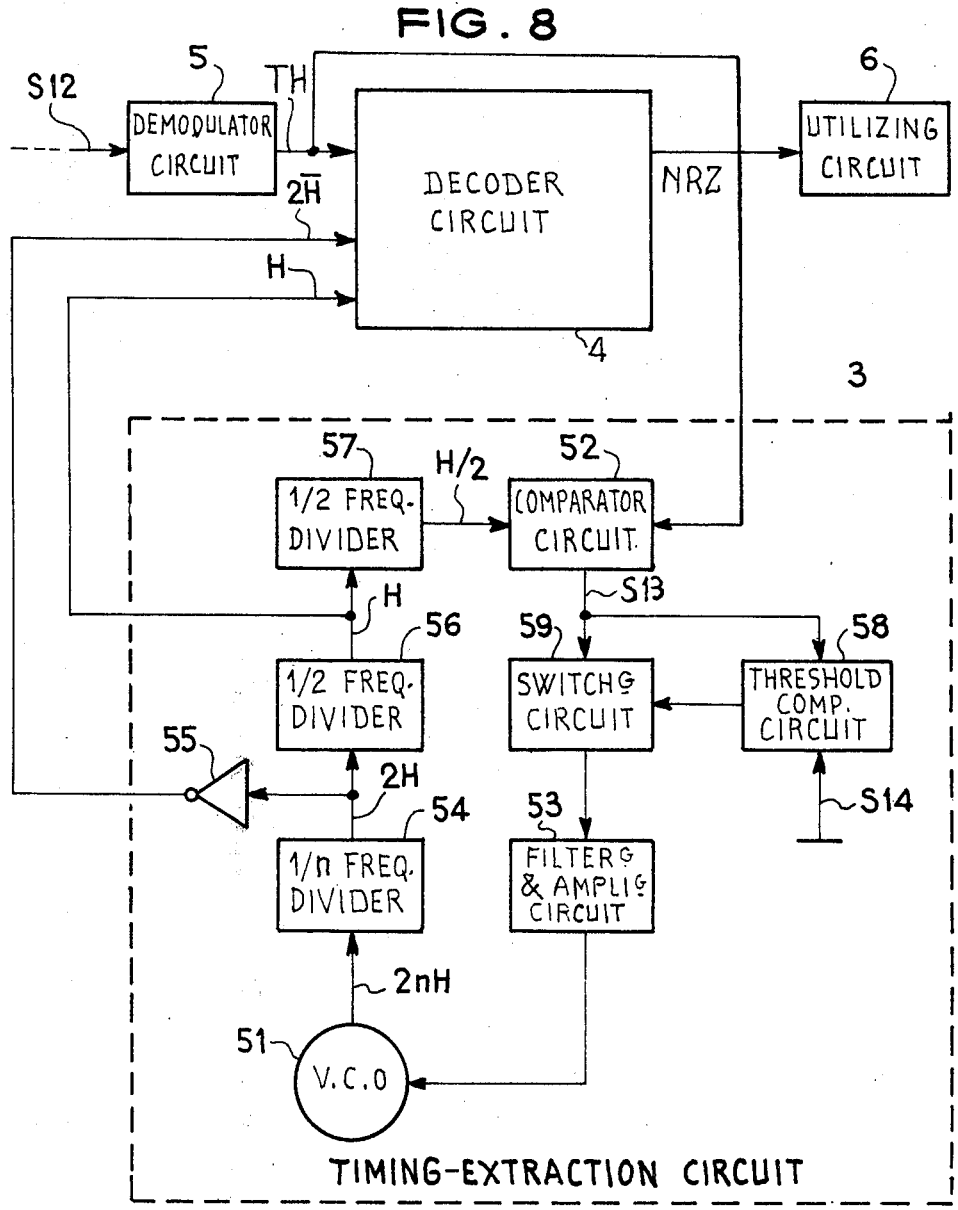
FIG. 8 is a diagram of a circuit arrangement for generating synchronizing signals at the reception end of a transmission system embodying my invention.

In FIG. 8 I have shown an embodiment of the timing-extraction circuit 3 in FIG. 6 which allows the clock signal H to be extracted and the signal $2\overline{H}$ to be produced therefrom. Allowance is made in this example for the transmitted message to be preceded by a synchronizing sequence made up of alternating 0 and 1 bits, i.e., 010101 .... After transition coding this sequence gives a signal TH which is made up of alternating pulses of voltage levels +A and −A 1 of duration T i.e. a square wave of period 2T, constituting a phase-shifted replica of divider output H/2. This sequence is used to frequency-lock an oscillator 51. The signals S12 arriving at the input of the receiver are, if necessary, processed in a demodulator circuit 5 to get rid of the carrier frequency and to extract the modulating signal TH. Oscillator 51 is controlled by a phase-locking loop which includes a phase-comparator circuit 52 and a filtering and amplifying circuit 53 in cascade. The comparator receives a local reference oscillation of frequency H/2 and the output signal TH from the demodulator connected upstream of decoder 4 to the data channel carrying the signal voltage S12. The oscillator 51, which is of the voltage-controlled type, has a center frequency equal to $2nH$ or close to this value. A circuit 54 divides the frequency by $n$ and shapes the wave from the oscillator digitally to produce signal 2H. The latter, after passing through an inverter circuit 55, is transmitted to the decoder circuit 4 the output signal of which, in NRZ form, is transmitted to a utilization circuit or load 6 for the exploitation of the reconstructed binary information. The local waves H and H/2 are produced by frequency dividers 56 and 57 of the binary-dividing flip-flop type having each a step-down ratio of 1:2. Output S13 of comparator 52 is compared with a predetermined threshold S14 in a circuit 58 the output of which controls a switching circuit 59. The latter opens the loop as soon as the oscillator has been locked on with the desired accuracy as dictated by the threshold. If desired circuit 58 may be replaced by a logic structure of the bidirectional-counter type which is supplied with one of the clock signals 2H, H or H/2. The synchronizing sequence is made sufficiently long to allow the oscillator to be locked on.

The advantages procured by the invention accrue chiefly from the fact that the frequency band required for the transmission of signals which have been coded in the NRZ code is reduced by approximately a third. The reduction in bandwidth is even greater in the case of coding with the return-to-zero code or the biphase code.

It is understood that the method employed is the same if, in the bit stream subjected to transcoding by the method described above, the symbols 0 and "1" are interchanged.

What is claimed is:

1. A method of converting a series of bits into a binary signal with a reduced changeover rate, comprising the steps of:
   temporarily storing successive bits of a bit stream coinciding with respective clock cycles;
   generating a two-level signal voltage;
   changing the level of said signal voltage in the middle of a clock cycle upon a shift from a first kind of bit to a second kind of bit in said bit stream;
   changing the level of said signal voltage at the end of a clock cycle upon the occurrence of said first kind of bit in a succession of a plurality of bits of said first kind following a shift from a bit of said second kind in said bit stream; and
   keeping constant the level of said signal voltage in all other instances.

2. A method as defined in claim 1 wherein said first kind of bit represents a binary 0 and said second kind of bit represents a binary 1.

3. A method as defined in claim 1 wherein said bit stream is of the non-return-to-zero format.

4. A transcoding system for binary information, comprising:
   a source of clock pulses having a frequency corresponding to the bit rate of a bit stream to be transcoded;

storage means controlled by said clock pulses for temporarily preserving a plurality of successive bits of said bit stream; and voltage-generating means connected to said storage means for producing a two-level signal voltage with a level change in the middle of a clock cycle upon a shift from a first kind of bit to a second kind of bit in said bit stream and with a level change at the end of a clock cycle upon the occurrence of said first kind of bit in a succession of a plurality of bits of said first kind following a shift from a bit of said second kind in said bit stream, the level of said signal voltage being constant in all other instances.

5. A system as defined in claim 4 wherein said storage means comprises a three-stage shift register, said voltage-generating means comprising logical circuitry connected to outputs from the stages of said three-stage shift register.

6. A system as defined in claim 5 wherein said logical circuitry comprises first and second coincidence gates and a flip-flop connected to be switched by the combined outputs of said coincidence gates, said three-stage shift register including a first stage with an inverting output connected to said first coincidence gate, a second stage with an inverting output connected to said first coincidence gate and a noninverting output connected to said second coincidence gate, and a third stage with a noninverting output connected to said first coincidence gate and with an inverting output connected to said second coincidence gate, said source having two relatively phase-inverted outputs respectively connected to said first and second coincidence gates.

7. A system as defined in claim 4 wherein said storage means and said voltage-generating means are part of a data transmitter at one end of a communication channel, further comprising a data receiver at the other end of said channel including decoding means for reconstituting said bit stream from said signal voltage transmitted over said channel.

8. A system as defined in claim 7 wherein said decoding means comprises a four-stage shift register, timing means for stepping said four-stage shift register at twice the frequency of said clock cycles, and logical gating means connected to outputs from the stages of said four-stage shift register.

9. A system as defined in claim 8 wherein said gating means comprises first, second and third anticoincidence circuits, a first coincidence circuit connected to receive the noninverted output of said first anticoincidence circuit and the inverted outputs of said second and third anticoincidence circuits, a second coincidence circuit connected to receive the noninverted output of said second anticoincidence circuit and the inverted output of said third anticoincidence circuit, and a bistable circuit connected to be set and reset at the frequency of said clock cycles under the control of the noninverted output of said third anticoincidence circuit and of the combined outputs of said coincidence circuits, respectively; said four-stage shift register including a first stage with an inverting and a noninverting output connected in parallel to said first and second anticoincidence circuits, a second stage with an inverting and a noninverting output connected to said second anticoincidence circuit, a third stage with an inverting and a noninverting output connected in parallel to said first and third anticoincidence circuits, and a fourth stage with an inverting and a noninverting output connected to said third anticoincidence circuit.

10. A system as defined in claim 8 wherein said timing means comprises a local oscillator with an operating frequency harmonically related to the frequency of said clock cycles and provided with a phase-locking loop, frequency-dividing means connected to said oscillator for generating a reference oscillation of half the frequency of said clock cycles, comparison means connected to said frequency-dividing means and to said channel upstream of said decoding means for receiving therefrom a square wave of half the frequency of said clock cycles generated at said data transmitter from a synchronizing sequence of alternating bits of binary values 0 and 1, and switch means controlled by said comparison means for opening said phase-locking loop upon coincidence of said square wave with said reference oscillation.

* * * * *